United States Patent [19]

Schoeneman

[11] 3,948,459

[45] Apr. 6, 1976

[54] FOLDED VACUUM TANKS FOR HIGH SPEED MAGNETIC TAPE RECORDERS

[75] Inventor: Robert E. Schoeneman, East Setauket, N.Y.

[73] Assignee: Potter Instrument Co., Inc., Plainview, N.Y.

[22] Filed: May 1, 1974

[21] Appl. No.: 466,025

[52] U.S. Cl. ................................................ 242/182
[51] Int. Cl.² ..................... G11B 15/58; G11B 23/12
[58] Field of Search ........... 242/182, 183, 184, 185; 226/118, 95, 97

[56] References Cited
UNITED STATES PATENTS

| | | |
|---|---|---|
| 2,980,355 | 4/1961 | Cannings ............................ 242/185 |
| 3,091,409 | 5/1963 | Goodale .............................. 226/97 |
| 3,191,837 | 6/1965 | Cohen et al. ...................... 242/182 |
| 3,525,481 | 8/1970 | Longland .......................... 242/183 |

*Primary Examiner*—Leonard D. Christian
*Attorney, Agent, or Firm*—Alfred W. Barber

[57] ABSTRACT

The vacuum buffer tape loop tanks for high speed magnetic recorders formerly made in the form of long, straight channels, are folded into L, U or other more complex shapes whereby much more efficient usee is made of cabinet space for tape handling equipment. Greater acceleration of the tape by the driving capstan is also made possible by the folded tank.

1 Claim, 7 Drawing Figures

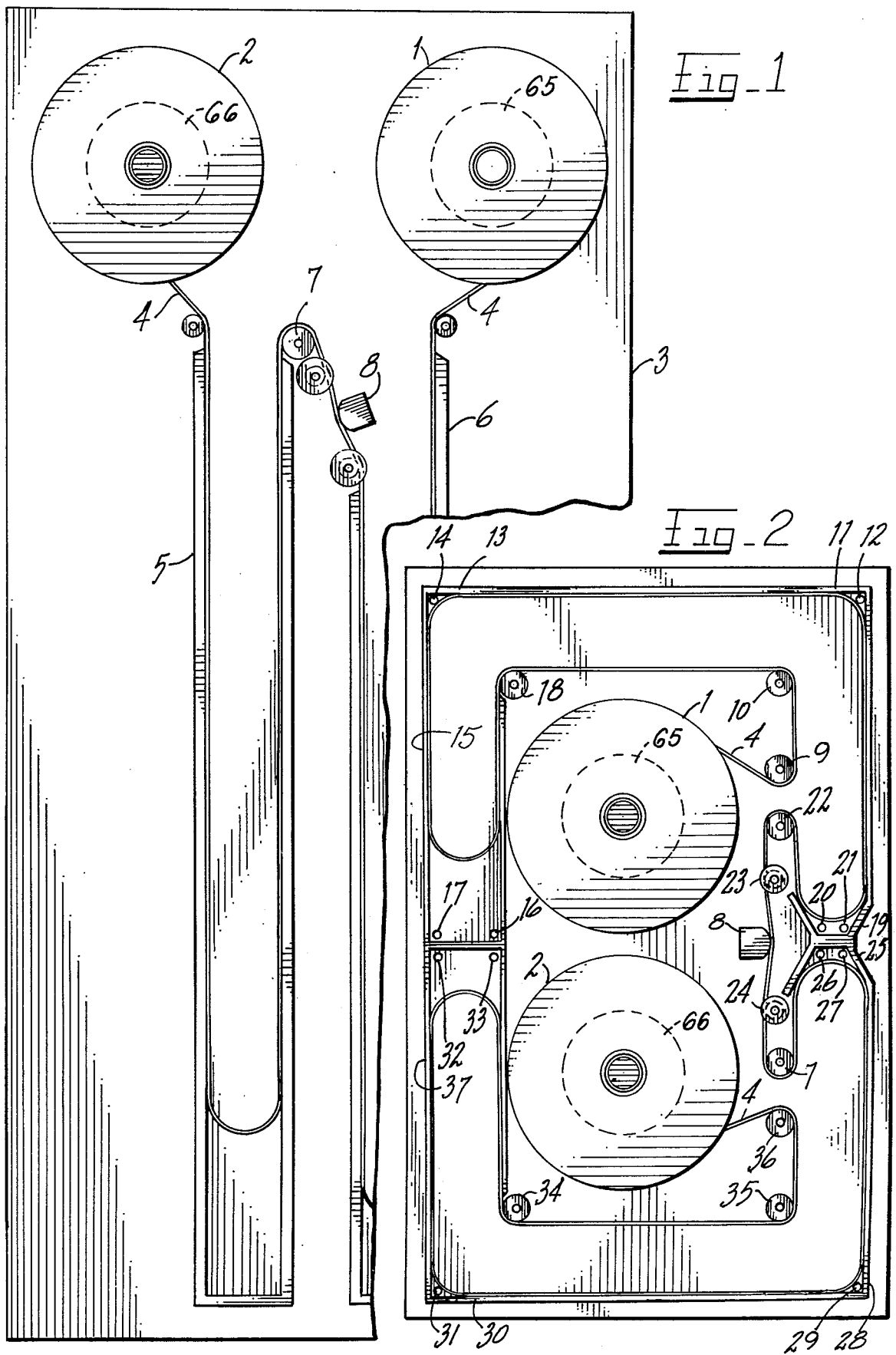

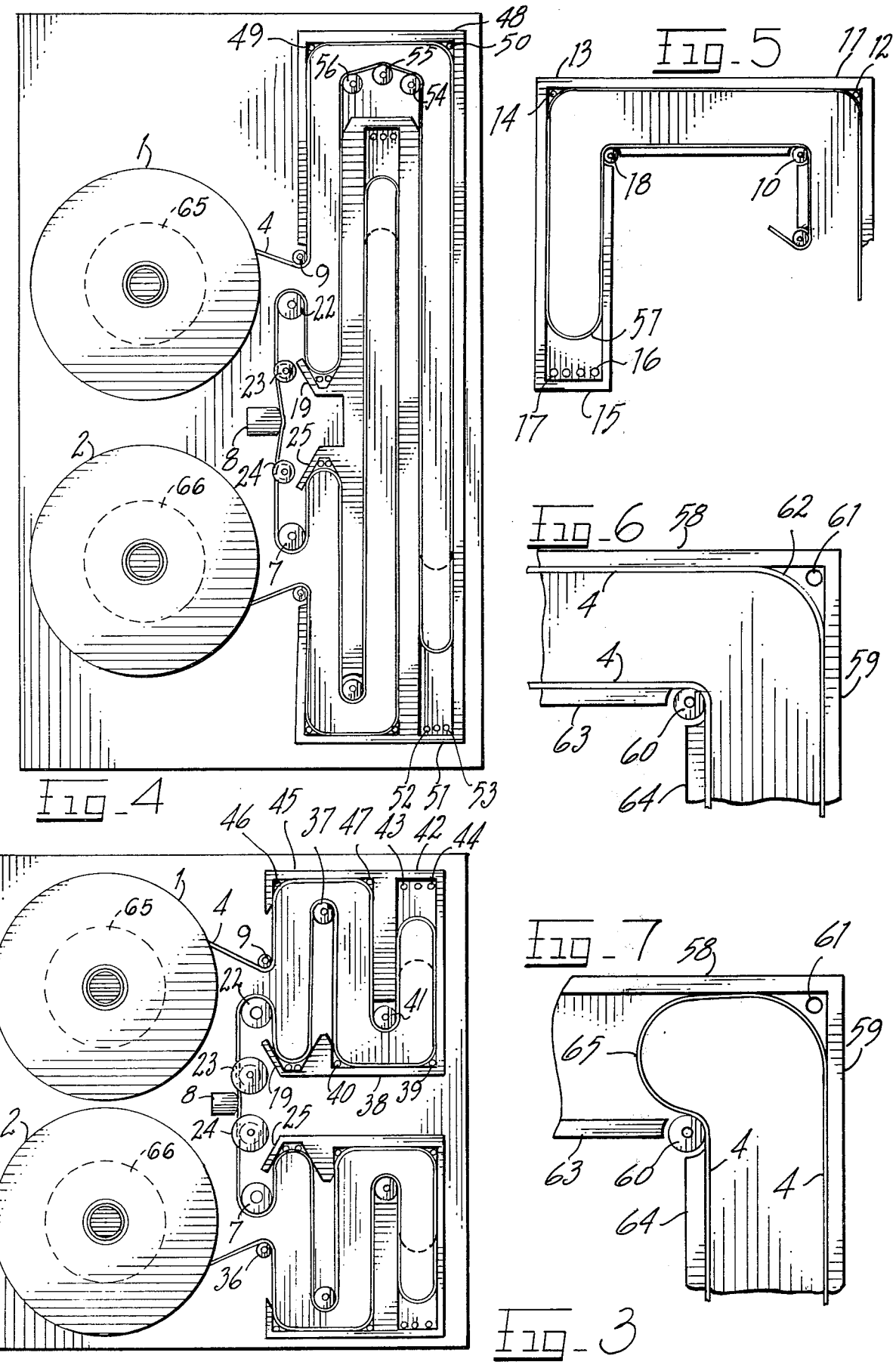

FOLDED VACUUM TANKS FOR HIGH SPEED MAGNETIC TAPE RECORDERS

BACKGROUND OF THE INVENTION

In high speed magnetic tape handlers, magnetic tape is reeled back and forth between a supply reel and a take-up reel passing over a record/play-back head. The tape is drawn across the head by a capstan usually driven by a fast response low inertia DC motor. In such machines the tape is accelerated and decelerated at extremely high rates posing a very severe problem on means for maintaining uniform tension on the tape in the vicinity of the record/play-back head at all times. The inertia of the supply and take-up reels is such that, although they may be driven by powerful servo motors, they cannot provide the required uniform tension. Accordingly, it is usual to provide a substantial vacuum buffer on each side of the capstan and between it and the servo controlled reels. These vacuum buffers are typically provided by means of rectangular straight channels generally about 2 to 3 inches wide and as long as dictated by the response time of the reel servos. Vacuum ports at appropriate points, particularly at the bottom of the tank, couple a vacuum system to the buffer channels. Additional small buffers may be provided usually one on each side of the record/play-back head, to accommodate rapid acceleration of the tape.

A typical high speed magnetic tape handler is constructed with the two reels (supply and take-up) mounted in the upper part of a cabinet enclosure with the capstan and head mounted below and the two vacuum tanks extending downward, centrally located and side-by-side. Illustrating the system with 10½ inch diameter reels, a typical cabinet is of the order of 27 inches wide and 63 inches high. The result is a substantial area of unused space on each side of the vacuum tanks and below the reels. It is the object of the present invention to more efficiently use the cabinet area.

SUMMARY OF THE INVENTION

It has been found possible, in accordance with the present invention, to fold the vacuum tanks into L, U or other more complex shapes and thereby to very substantially reduce the panel area required to house a high speed magnetic tape handler. A typical tape handler, in accordance with the present invention, occupies less than half the panel space of an equivalent tape handler made in accordance with the teachings of the prior art. The unused panel space is reduced to a very low percentage of the total panel area. Generally, the present invention makes possible housing two high speed tape handlers on a panel area formerly required by only one. In addition, it has been found that the folded vacuum tank configuration provides a faster response to tape acceleration when compared with the prior art tanks.

BRIEF DESCRIPTION OF THE DRAWINGS

FIG. 1 is simplified elevation view of a prior art high speed magnetic tape handler employing two vacuum buffer tanks.

FIG. 2 is a simplified elevation view of the preferred form of the present invention.

FIG. 3 is a modified form of the present invention.

FIG. 4 is another modified form of the present invention.

FIG. 5 is a detail of a portion of the form of the invention shown in FIG. 2.

FIG. 6 is an enlarged detail of a portion of the detail shown in FIG. 5.

FIG. 7 is an illustration of how the tape behaves at one point of its path in a folded vacuum tank.

DESCRIPTION OF THE PREFERRED EMBODIMENTS

FIG. 1 shows in simplified form the elevation view of a typical prior art high speed magnetic tape handler. A supply reel 1 and a take-up reel 2 are mounted near the top of a cabinet 3. It can be assumed that a panel mounted inside the cabinet provides a suitable mounting for the reels and other components to be described below. The magnetic tape passes back and forth between the two reels rotated by suitable servo means for winding the tape in a selected direction as indicated at 65 and 66, with said tape driven by capstan 7 and over record/play-back head 8. Superimposed between the capstan and head and each of the reels is a vacuum tank for maintaining a constant tension on the tape at the head and at the same time permitting fast acceleration of the tape in either direction. Tank 5 is between the capstan and take-up reel 2, while tank 6 is between the head and supply reel 1. When the tape is accelerated or decelerated, only the low inertia loops in the vacuum tanks must respond instantaneously. Before the tape in the tanks is moved too far, the servo driven reels come into operation, usually in response to loop position sensors in the tanks, to restore the initial positions of the tape loop in the tanks.

Even with powerful fast acting servo motors driving the tape reels, it is still necessary to have buffer tanks of substantial length. Typically, tanks 5 and 6 are 30 inches long by 2 inches wide for a 200 i.p.s. tape drive. It can be seen that with the two reels side-by-side at the top of the cabinet and the 30 inch long vacuum tanks in the central area below, that there is a substantial area of unused panel area and cabinet space on each side of the vacuum tanks. It is the purpose of this invention to provide a form of folded vacuum tank which permits essentially doubling the efficiency of utilization of the panel space. In other words, two tape handlers can now be mounted in a cabinet and on a panel formerly carrying only one tape handler.

FIG. 2 is a simplified elevation view of the preferred form of the present invention. In this form the tape reels 1 and 2 are mounted one above the other and the magnetic tape 4 is passed through two similar folded vacuum tanks surrounding the reels and two high speed buffers in traveling from one reel to the other. Following the path of the magnetic tape 4 from supply reel 1, it turns corners around roller or air bearings 9, 10 and 18 until it approaches end of channel 15 provided with vacuum ports 16 and 17 where it turns back passing inside corners 13 and 11 provided with vacuum ports 14 and 12 respectively, to high speed buffer 19 provided with vacuum ports 20 and 21 where it again reverses direction passing over air bearing 22 and across tape guide 23 to record/play-back head 8. From this point it follows a path which is a mirror image of the path described up to this point, passing across a second tape guide 24, around drive capstan 7 and into a second high speed buffer 25 provided with vacuum ports 26 and 27, there reversing direction and passing inside corners 28 and 30 provided with vacuum ports 29 and 31 respectively, to the vicinity of end of channel 37 provided with vacuum ports 32 and 33 where it again reverses direction and, after cornering around rollers or air bearings 34, 35 and 36, passes onto take-up reel 2. The path is reversed in passing backward from take-up reel 2 to supply reel 1. The whole assembly can be rotated 90 degrees clockwise or oriented in any other desired manner.

The sum of the individual straight portions of the folded tank should be made to be approximately equal to the straight tank length of the prior art machines for a given tape speed design. However, the folded tank has been found to provide more uniform tension at the record/play-back head under high speed reversals and at high linear tape speeds. This is due to the fact that each corner of the folded tank acts as a high speed buffer which breaks up the total tape loop into two or more segments of lower mass and inertia. Thus, the form of folded tank shown in FIG. 2 and described above provides three segments in each loop, each of approximately one-third the inertia of a full straight loop as provided by the prior art.

FIG. 3 shows a modified form of the invention in which the vacuum tank is folded on one side of the supply and take-up reels providing a somewhat different form factor for the complete assembly. The reels 1 and 2 feed into similarly folded tanks only one of which need be described in detail. Looking at the upper folded tank, the magnetic tape 4 leaving supply reel 1 passes around a first corner around roller or air bearing 9, upward into a rectangular section 45 having corner vacuum ports 46 and 47, thence downward and around roller or air bearing 41, upward to a second rectangular section or pocket 42 provided with end vacuum parts 43 and 44, downward to rectangular section 38 provided with corner vacuum parts 39 and 40, upward to roller or air bearing 37, around it and downward to high speed buffer 19, upward to air bearing 22, around it and downward over guide 23 to record/play-back head 8. The path from head 8 back to take-up reel 2 is a mirror image of the path just described and operates in the same manner.

An examination of the tape path in accordance with FIG. 3 and described above will show that the tape loops are broken into at least three pieces and, furthermore, since each corner functions as a high speed buffer, that four high speed buffers have been effectively added (at 46, 47, 39 and 40). A high speed buffer is formed wherever the tape turns a corner provided with a vacuum port.

FIG. 4 is another modified form of a folded vacuum tank. The magnetic tape 4 leaving supply reel 1 passes around roller 9, upward into rectangular section 48 provided with corner vacuum vents 49 and 50, downward toward end section 51 provided with vacuum vents 52 and 53, then upward turning around over rollers or air bearings 54, 55 and 56, downward into high speed buffer 19, up over air bearing 22, and over guide 23 to record/play-back head 8. The path from head 8 back to take-up reel 2 is substantially a mirror image of the path just described although it is folded to fit inside channel 48.

While three forms of folded vacuum tank have been shown and described, other forms are possible in accordance with the teachings of the present invention. The essential requirements are: that the tank be folded at least once at any angle up to 180° conserving space and reducing the inertia of a given segment of tape and that the fold points be provided with vacuum ports.

FIG. 5 is an enlarged view of one form of the invention, being substantially like the form shown in FIG. 2 and described above. It shows that while the complete channel sides have been omitted from FIGS. 2, 3 and 4, that, actually, the vacuum tank channels are enclosed on all sides including the panel on which the channels are mounted and the door which may be opened to change reels. FIG. 5 also indicates how the end of the tape loop 57 does not sit at the end of the channel at 15 but is maintained in an intermediate position so that the loop can either pay out tape or take on more thus providing slack to allow time for the tape reels to come into play.

FIG. 6 is another enlarged detail showing a typical corner of a folded tank system. Tape 4 is confined between tank side 58–59 forming an outer corner and 63–64 forming an inner corner. At the inner corner, tape 4 passes over a roller or air bearing 60. At the outer corner there is provided a typical vacuum port 61 and the tape, under stable operating conditions, assumes a curve substantially as shown at 62. Under conditions of acceleration or deceleration the tape at 62 is drawn further into the corner or pulled further out.

FIG. 7 is an enlarged detail which can be taken to be a corner of the system similar to the one shown in FIG. 6 and described above. This Figure is provided to show how the tape 4 behaves as it turns a corner in the folded vacuum tank system. It advances around the corner in a bulge like that shown at 65.

In order to clarify the terms used in the claims the following definitions are made:

Coordinated means: refers to DC motor means such as servo drives which rotate the tape reels in unison so that there is no ambiguous relationship between the reels.

Complex path: describes the vacuum chamber configuration directing the tape in a folded path between the reels.

Tape guiding means: a roller or channel for directing the tape along a predetermined lateral path.

Vacuum chamber: a channel defined on four sides for confining the tape along a predetermined path.

Buffer means: small corners or cavities having vacuum properties which affect the tape tension only along a relatively short length of said tape.

I claim:
1. In a magnetic tape handler, the combination of:
a length of magnetic tape;
a pair of tape reels.
servo means for rotating said reels to wind said tape in a selected direction;
vacuum chamber means and tape guiding means for directing said tape along a predetermined path between said reels;
a record and/or reproduce head located tangentially to said path between said reels;
a tape drive capstan for moving said tape across said head located on one side od said head;
wherein said vacuum chamber means is directed around said tape reels and executes at least one turn of the order of 90°;
wherein said head is located substantially midway of the tape path between said reels;
and wherein said vacuum chamber means is folded symmetrically to substantially surround said reels.

* * * * *